US007664815B2

(12) United States Patent
Gundersen et al.

(10) Patent No.: US 7,664,815 B2
(45) Date of Patent: Feb. 16, 2010

(54) COMMUNICATION METHOD AND SYSTEM

(76) Inventors: Lars Gundersen, Nonnegt. 17, Oslo (NO) N-1375; Lars Bratthall, Rugdefaret 8D, Slependen (NO) N-1341; Ole Jakob Soerdalen, Jongsåsvn. 31A, Sandvika (NO) N-1338

( * ) Notice: Subject to any disclaimer, the term of this patent is extended or adjusted under 35 U.S.C. 154(b) by 415 days.

(21) Appl. No.: 10/923,093

(22) Filed: Aug. 23, 2004

(65) Prior Publication Data
US 2005/0138120 A1 Jun. 23, 2005

Related U.S. Application Data

(63) Continuation of application No. PCT/IB03/00618, filed on Feb. 21, 2003.

(30) Foreign Application Priority Data
Feb. 22, 2002 (NO) .............................. 20020856

(51) Int. Cl.
*G06F 15/16* (2006.01)
(52) U.S. Cl. ...................... 709/204; 707/102
(58) Field of Classification Search ................ 709/227; 455/415; 701/29, 1; 340/425.5
See application file for complete search history.

(56) References Cited

U.S. PATENT DOCUMENTS

| 5,261,735 | A  | * | 11/1993 | Cohen et al. ................ 312/282 |
| 5,625,410 | A  | * | 4/1997  | Washino et al. ............. 348/154 |
| 5,666,534 | A  |   | 9/1997  | Gilbert et al. |
| 6,198,457 | B1 |   | 3/2001  | Walker et al. |
| 6,377,793 | B1 | * | 4/2002  | Jenkins ..................... 455/412.1 |
| 6,389,337 | B1 | * | 5/2002  | Kolls .......................... 701/29 |
| 6,523,022 | B1 | * | 2/2003  | Hobbs ........................... 707/3 |
| 6,590,602 | B1 | * | 7/2003  | Fernandez et al. ........ 348/14.08 |
| 6,646,564 | B1 | * | 11/2003 | Azieres et al. .............. 340/679 |
| 6,704,039 | B2 | * | 3/2004  | Pena ........................ 348/14.01 |
| 6,731,324 | B2 | * | 5/2004  | Levy ........................ 348/14.08 |
| 6,768,998 | B2 | * | 7/2004  | Leonard et al. ............. 707/102 |
| 6,965,593 | B2 | * | 11/2005 | Donahue et al. ............ 370/352 |
| 6,985,750 | B1 | * | 1/2006  | Vicknair et al. ............. 455/519 |
| 7,093,017 | B1 | * | 8/2006  | Olgaard et al. .............. 709/227 |

(Continued)

FOREIGN PATENT DOCUMENTS

FR     2765440 A1    12/1998

(Continued)

OTHER PUBLICATIONS

United States Patent Application Publication No. US 2002/0121969 A1, Published Sep. 5, 2002.

(Continued)

*Primary Examiner*—Thong H Vu
(74) *Attorney, Agent, or Firm*—Perkins Coie LLP

(57) ABSTRACT

A method to provide technical information from a marine vessel to a remote location by means of a computer connected and logged in to a communication means of the marine vessel. The technical information concerns an equipment or system associated with, or installed on, the marine vessel. A communication session on the logged in computer is initiated. An address is selected from an address list of one or more technical specialists associated with the equipment. A message is sent to a remote address. A communication session on a remote computer system is initiated at the remote address with the logged in computer.

36 Claims, 15 Drawing Sheets

U.S. PATENT DOCUMENTS

| | | | |
|---|---|---|---|
| 7,096,009 B2 * | 8/2006 | Mousseau et al. | 455/415 |
| 7,319,992 B2 * | 1/2008 | Gaos | 706/62 |
| 2002/0067408 A1 * | 6/2002 | Adair et al. | 348/76 |
| 2002/0091836 A1 * | 7/2002 | Moetteli | 709/227 |
| 2002/0098800 A1 * | 7/2002 | Frazita et al. | 455/12.1 |
| 2002/0122410 A1 * | 9/2002 | Kulikov et al. | 370/349 |
| 2002/0133545 A1 * | 9/2002 | Fano et al. | 709/203 |
| 2002/0162032 A1 * | 10/2002 | Gundersen et al. | 713/300 |
| 2003/0069752 A1 * | 4/2003 | LeDain et al. | 705/2 |
| 2003/0117948 A1 * | 6/2003 | Ton et al. | 370/218 |
| 2005/0120305 A1 * | 6/2005 | Engstrom et al. | 715/760 |
| 2005/0203673 A1 * | 9/2005 | El-Hajj et al. | 701/1 |
| 2005/0262542 A1 * | 11/2005 | DeWeese et al. | 725/106 |

FOREIGN PATENT DOCUMENTS

| | | | |
|---|---|---|---|
| WO | WO-0055714 A1 | 9/2000 | |
| WO | WO 01/02953 A1 | 1/2001 | |
| WO | WO 01/89139 A1 | 11/2001 | |
| WO | WO 02/13104 A2 | 2/2002 | |

OTHER PUBLICATIONS

"On Enabling Secure Applications Through Off-line Biometric Identification," George I. Davida, et al., 1998 IEEE Symposium on Security and Privacy, May 3-6, 1998, Oakland, California.

"Networked Diagnostic Communications in aAvionics Support," John k. Scully, *IEEE*, 2000, pp. 505-512.

Chinese Office Action; Patent Application No. 03808911.4; Application Filing Date: Feb. 21, 2003; Applicant: ABB Research Ltd; Mailed on Feb. 6, 2009; 20 pages.

Microsoft Windows Technologies "Windows NetMeeting Features," 1999, 8 pgs.

Microsoft Corporation, "Readme" Microsoft NetMeeting, Aug. 1996, pp. 1-13.

Cross, K., "A Flexible Maintenance Information System for a Downsized Environment," Autotestcon '94, IEEE Systems Readiness Technology Conference, Cost Effective Support into the Next Century, Conference Proceedings, Anaheim CA, pp. 637-641.

Mansfield, "Techniques for Automated Network Map Generation Using SNMP," IEEE, 1996, pp. 473-480.

Written Opinion; PCT Application No. PCT/IB03/00618; Applicant: ABB Research LTD et al.; Date of Mailing: Mar. 9, 2004, 13 pages.

* cited by examiner

COMMUNICATION METHOD AND SYSTEM

CROSS-REFERENCE TO RELATED APPLICATIONS

This application is a continuation of PCT/IB03/00618 filed 21 Feb. 2003 and claims priority to Norwegian patent application 20020856 filed 22 Feb. 2002.

TECHNICAL FIELD

The present invention is concerned with a method and system for communication between a marine vessel and another location, which may be on land or on another vessel. In particular the invention is a method and system to communicate technical information between a marine vessel and a remote location.

BACKGROUND ART

Marine vessels are often located in locations that are not easy-to-reach. Marine vessels are often mobile and may travel to or operate in remote areas of the world. Failures in critical systems such as an engine breakdown or a fault in a positioning system can present serious risks, including risk of fatalities to personnel and damage to the environment. Reliability of systems on a marine vessel are of critical importance. At the same time, offshore and marine industries face a demand from owners and customers to maintain operations at a low cost.

On-board equipment and systems on marine vessels are becoming increasingly complex. Diverse and sophisticated systems are commonly found onboard ships and may include systems such as electrical power management systems, process automation equipment, ventilation equipment, positioning systems, dynamic positioning and position mooring, propulsion control systems, and the like. Maintenance personnel on board normally do not have the competence to diagnose or fix problems related to every system in which a problem may occur. An on-board person may even have difficulties identifying which components need to be replaced and then obtaining spare parts efficiently. In such situations case delays and high costs are involved, especially when technical experts have to travel long distances to reach a marine vessel.

Marine vessels and ships may be equipped with control systems to control various equipment and systems on board which are not unlike industrial control and process control systems used in general manufacturing and other industries. Such control systems advantageously comprise or are in some way linked to maintenance systems to organise, schedule, carry out diagnoses etc. for maintenance of equipment or systems.

A software architecture that is used in an industrial control system manufactured by ABB is described in part by WO00102953 entitled "Method of integrating an application in a computerized system". WO00102953 discloses a method for integration of many and various types of applications in a computerized system. This method is based on a concept where real world objects are represented as "composite objects". Different facets of a real world object, such as its physical location, the current stage in a process, a control function, an operator interaction, a simulation model, some documentation about the object, etc., are each described as different aspects of the composite object. A composite object is a container for one or more such aspects. Thus, a composite object is not an object in the traditional meaning of object-oriented systems, but rather a container of references to such traditional objects, which implement the different aspects. Each aspect or group of aspects may be implemented by an independent software application, which provides its functionality through a set of interfaces that are accessible through the composite object. Another software application can thus query a composite object for a function associated with one of its aspects, and as a result obtain through the composite object a reference to the interface that implements the function. Industrial control systems generally comprise, include or are in some way linked to maintenance systems to organise, schedule, diagnosis etc. maintenance of equipment or systems controlled by the control system.

Ordinary computer systems and networked computers are often provided with technical support for application problems, network problems and so on by means of remotely located technical support specialists. Typically a remotely located Help Desk specialist may be contacted by phone, e-mail, intranet or the Internet etc. to assist with a problem of a computerised system. Certain software applications familiar to those skilled in the art of Local Area Networks (LANs) are readily available so that a technical specialist at a remotely located Help Desk may look at a display running on the problematic computer system and input selections or commands as though the specialist were present in person. However, such specialists are only able to assist with computer program or operating system/network operating system i.e. "computer system" problems related to the operations of a specific LAN.

Maintenance personnel on board a marine vessel may use a control system to monitor, control, regulate equipment and or systems installed on, or associated with, the marine vessel. Such a system may contain extensive technical information about the equipment and systems onboard. However, it is difficult to collect information relevant to each configuration of possible onboard equipment, and for all technical eventualities. It is also difficult to keep such complex technical information up to date.

SUMMARY OF THE INVENTION

The aim of the present invention is to solve one or more of the above problems. This and other aims are realised by a method, a system, and a computer program product.

It is an aim of the invention to provide a method and system to provide communication between a user onboard a marine vessel and one or more specialists associated with the equipment.

According to an embodiment of the invention, a system is provided for providing a virtual meeting between a user onboard a marine vessel and a supplier's consultant, in which the system comprises an operator workstation, communication means and at least one server software providing a virtual meeting service.

According to another aspect of the invention an interface is provided for communication of technical information between a marine vessel and a remote location.

In another aspect of the invention a computer data signal is provided for communication of technical information between a marine vessel and a remote location.

The principal advantage of the inventive method is that a user such as a maintenance person onboard a marine vessel may show or provide technical information present onboard the vessel to a technical specialist who may be remotely located. In this way virtually instant access to a technical specialist for a given equipment or system may be provided, despite the fact that the marine vessel and the technical specialist may be thousands of kilometers apart. In particular a virtual meeting may be provided in which the set-up of the meeting is carried out by one click on a graphical or textual display of an operator workstation, so that the user can have virtual meeting with a consultant or other technical specialist associated with an equipment supplier or other specialist having technical expertise related to an equipment or system, e.g. a systems integrator. The user or maintenance person does not need to be specialist of each or every equipment or equipment system associated with or installed on the vessel.

Another advantage is the ease of use of the invention in that the user very easily makes contact with the appropriate technical expert without needing special training in communication technologies. In advantageous embodiments of the invention an Asset Optimisation server is included, making all technical information about items of equipment or systems accessible to the participants in the virtual meeting, simply and immediately.

Another advantage of the invention is that many facets of the invention may be implemented using commercially available products and services. The communication elements especially may be carried out using services and products commercially available in the majority of countries and regions of the world. This includes the use of existing satellite communications, and of Internet technologies, such as TCP/IP protocol communications via the Internet, protocol communications that build on top of TCP/IP protocol, or intranets, which enables the real time communication method and system to be implemented economically, using low cost and readily available hardware and software technology.

BRIEF DESCRIPTION OF THE DRAWINGS

A more complete understanding of the method and system of the present invention may be had by reference to the following detailed description when taken in conjunction with the accompanying drawing wherein.

DESCRIPTION OF THE PREFERRED EMBODIMENTS

Figure 1:
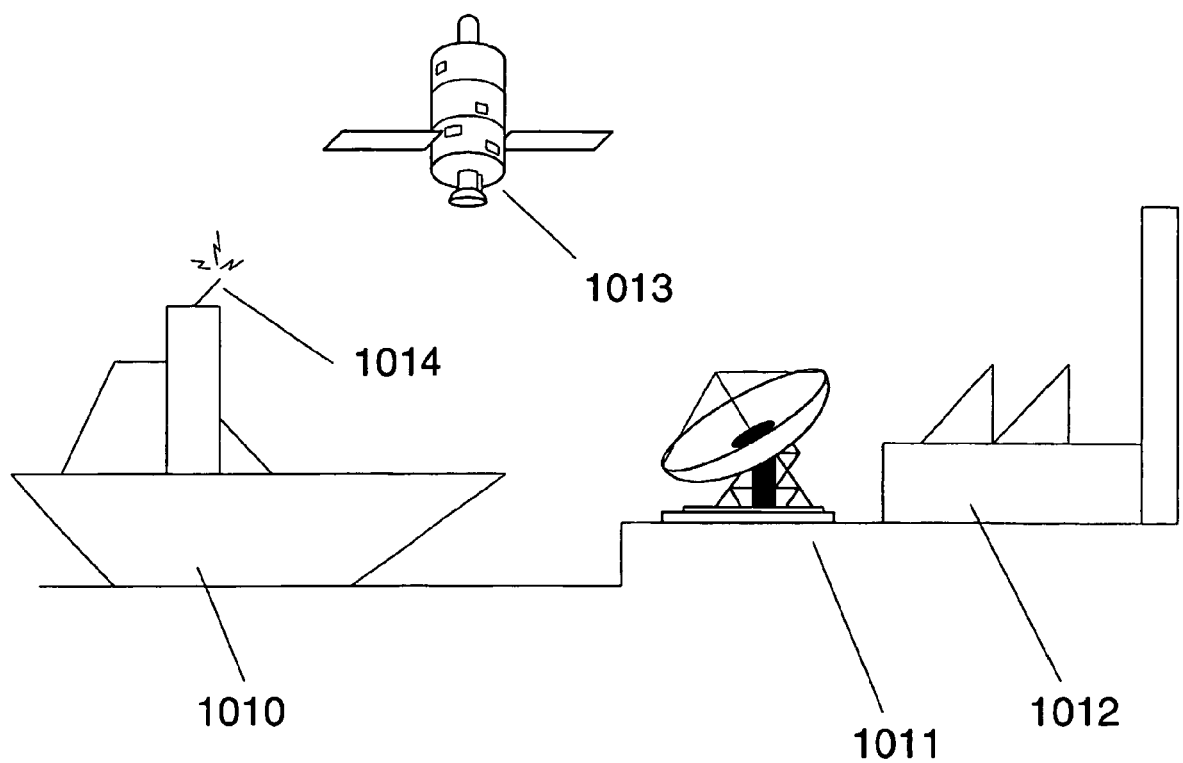
FIG. 1 shows schematically an overview of a system including a satellite communication link according to an embodiment of the invention.
Figure 2:
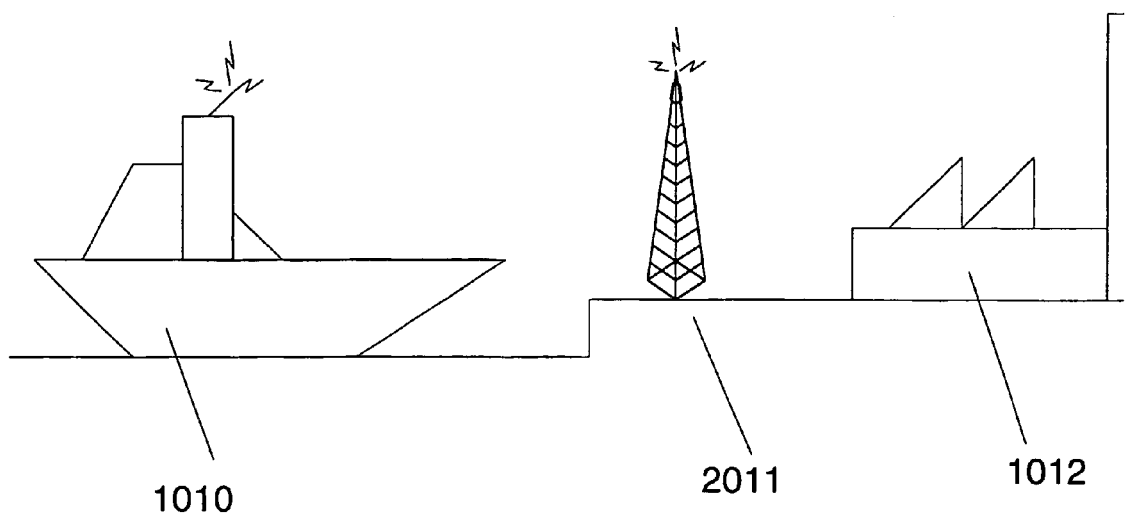
FIG. 2 shows schematically an overview of a system including a land based communication link according to an embodiment of the invention.

FIG. 1 shows an overview of a system and method according to the invention. A marine vessel 1010 is shown equipped with a wireless antenna 1014, and a communication satellite 1013, a ground receiver 1011 of a satellite communication system, and a location 1012 where one or more technical specialists may be located. FIG. 2 shows the system and method according to FIG. 1 in which a land based wireless communication system 2011, for example a telephone system such as GSM, is used to enable communications between the marine vessel and land or another location.

Figure 3:
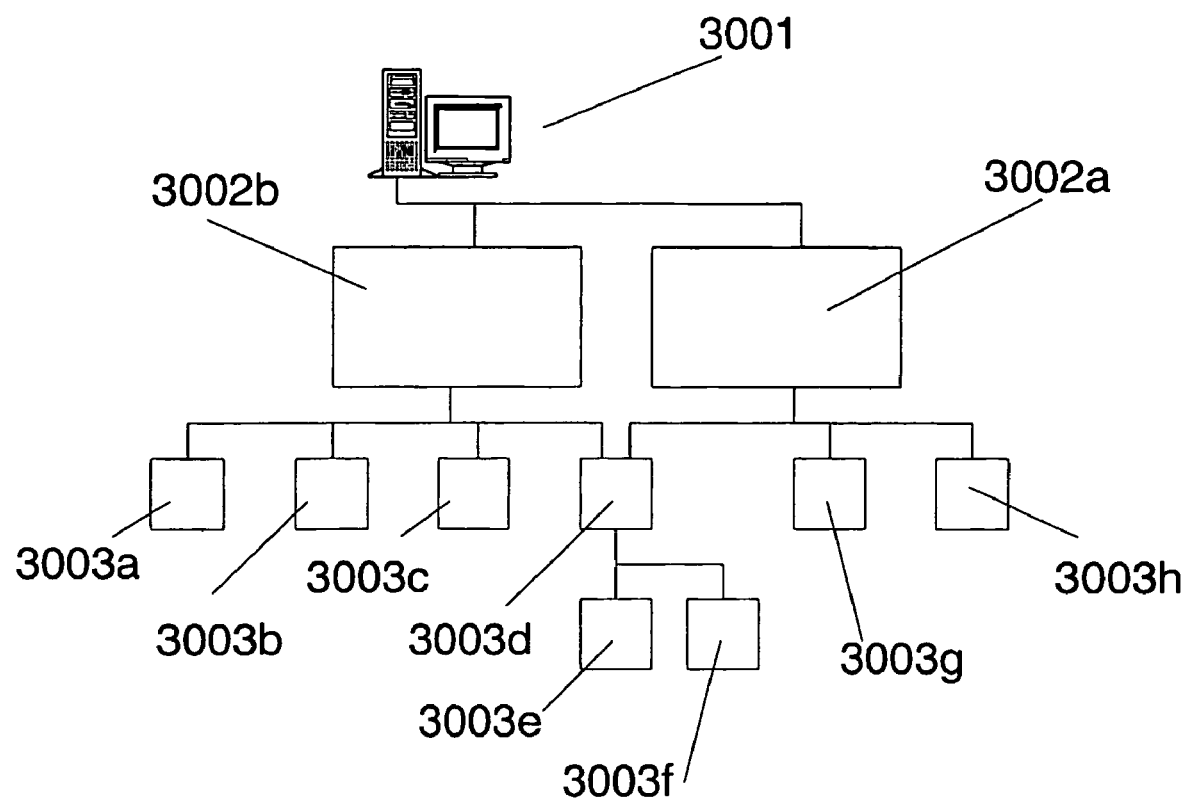
FIG. 3 shows schematically an overview of multiple equipment and/or systems including two controllers onboard a marine vessel, together with a Remote Monitoring and Control Server (RMC), according to an embodiment of the invention.
Figure 4:
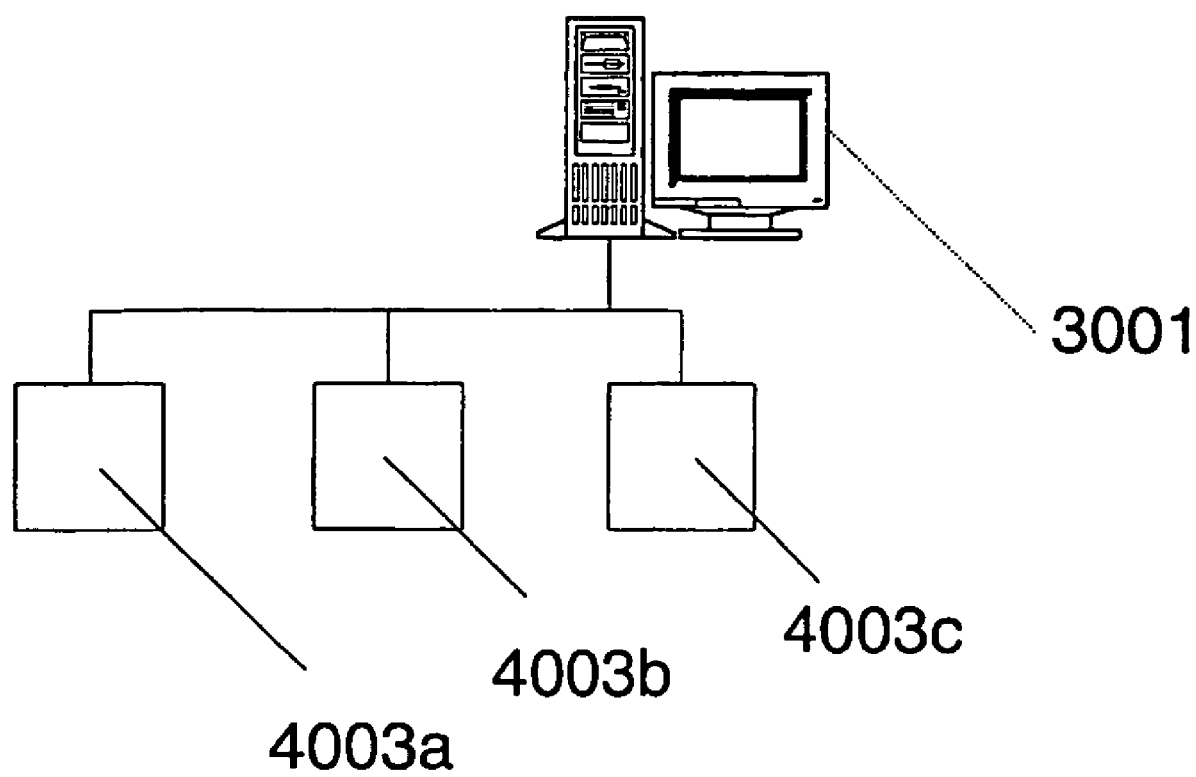
FIG. 4 and FIG. 5 show the RMC server connected directly in FIG. 5 and via a network in FIG. 4 to multiple equipment and/or systems according to another embodiment of the invention.
Figure 5:
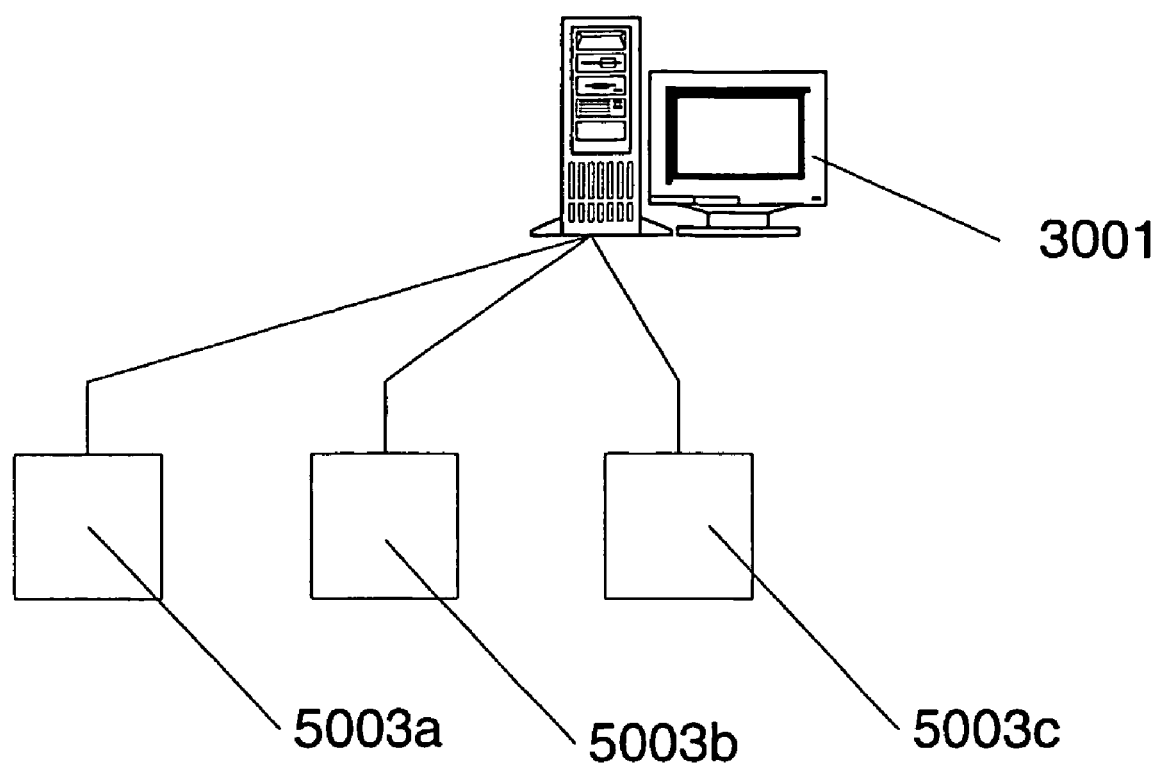

FIG. 3 shows a Remote Monitoring and Control Server (RMC) 3001 which may be present onboard the marine vessel 1010 FIGS. 1, 2. The RMC server is connected, in this example, to two devices 3002*a*, 3002*b* that may be controllers, such as process controllers in a distributed control system. A plurality of other devices 3003*a*-3003*h* are shown also connected to the controllers 3002*a*, 3002*b*. Such equipment or systems onboard the marine vessel may include, and are not limited to, motors, generators, propulsion units, valves, pumps or field devices and I/O equipment connected to the motors, field devices etc. Propulsion units, which may be of the type known as Azipods (TM) (azimuth podded propulsion units), are directionally variable thrust units used to position, maintain or dynamically maintain a position and attitude of a marine vessel at sea, for example, while manoeuvring the marine vessel relative to an offshore oil drilling installation. The devices 3003*a*-3003*h* are connected to the controllers via a bus or network such as a fieldbus.

In a first embodiment the invention may be practiced in an exemplary form by means of any computer on or near the marine vessel which is logged in, or otherwise suitably connected, to a means for wireless communication from the marine vessel to land or another location. A user onboard the marine vessel may require technical information from a technical specialist to assist him or her with a particular equipment or service. To obtain more technical information for an equipment or system a user can, by using the method and system of the invention, contact a technical support specialist.

Thus a user, who may be any operator, technician, maintenance person or other authorised person on the marine vessel 1010 logs in to a computer connected to a communications means on-board the vessel. The user then starts a communication session, preferably with a single action such as single click of a button on a computer mouse. In the simplest embodiment of the invention the user selects an address for one or more technical specialists from a list of technical specialists maintained in respect of the various equipment and systems on board. The communication session with a predetermined technical specialist at a remote location 1012, is established by means of an instant messaging or conferencing software application. An instance of the instant messaging/conferencing software runs on the logged in computer. The instant messaging/conferencing software starts a communication between the logged in computer on board the marine vessel 1010 and a computer system of the predetermined technical specialist at a remote location such as 1012. The technical specialist can, by this means, obtain a copy of any Graphical User Interface (GUI) that is running on the logged in computer. By this means the technical specialist can receive and monitor technical information in real time from the marine vessel and, amongst other actions, advise the user accordingly.

Such a user on the marine vessel may require assistance in order to carry out a technical action including any of:
monitor an onboard equipment or system,
inspect a maintenance or event log for an equipment or system,
produce a maintenance report generally,
produce a general operations report,
produce a maintenance report about a specific equipment or system,
analyse a report for an equipment or system,
analyse a report on a specific event or alarm,
produce a report on a specific event or alarm,
perform a diagnostic action for an equipment or system,
order service or spare parts,
perform a corrective action for an equipment or system.

The user may use other computer program application software as well as, or in addition to, functions in the logged on computer, or RMC server, or any onboard control program. The user may use applications such as Excel (Trade Mark) for calculations and analysis based on technical information or maintenance issues; a Computer Aided Design (CAD) program such as AutoCad (Trade Mark) to display drawings of an equipment or system, schematics for a wiring layout etc; and/or a scheduling program for operations of equipment or maintenance schedules for the equipment, and so on.

The method according to the invention is based on solving the problem that a user may require technical information from a technical specialist to assist him or her with a particular equipment or service. To obtain more technical information for an equipment or system a user can, by using the method and system of the invention, contact a technical support specialist, as described above.

Figure 15:
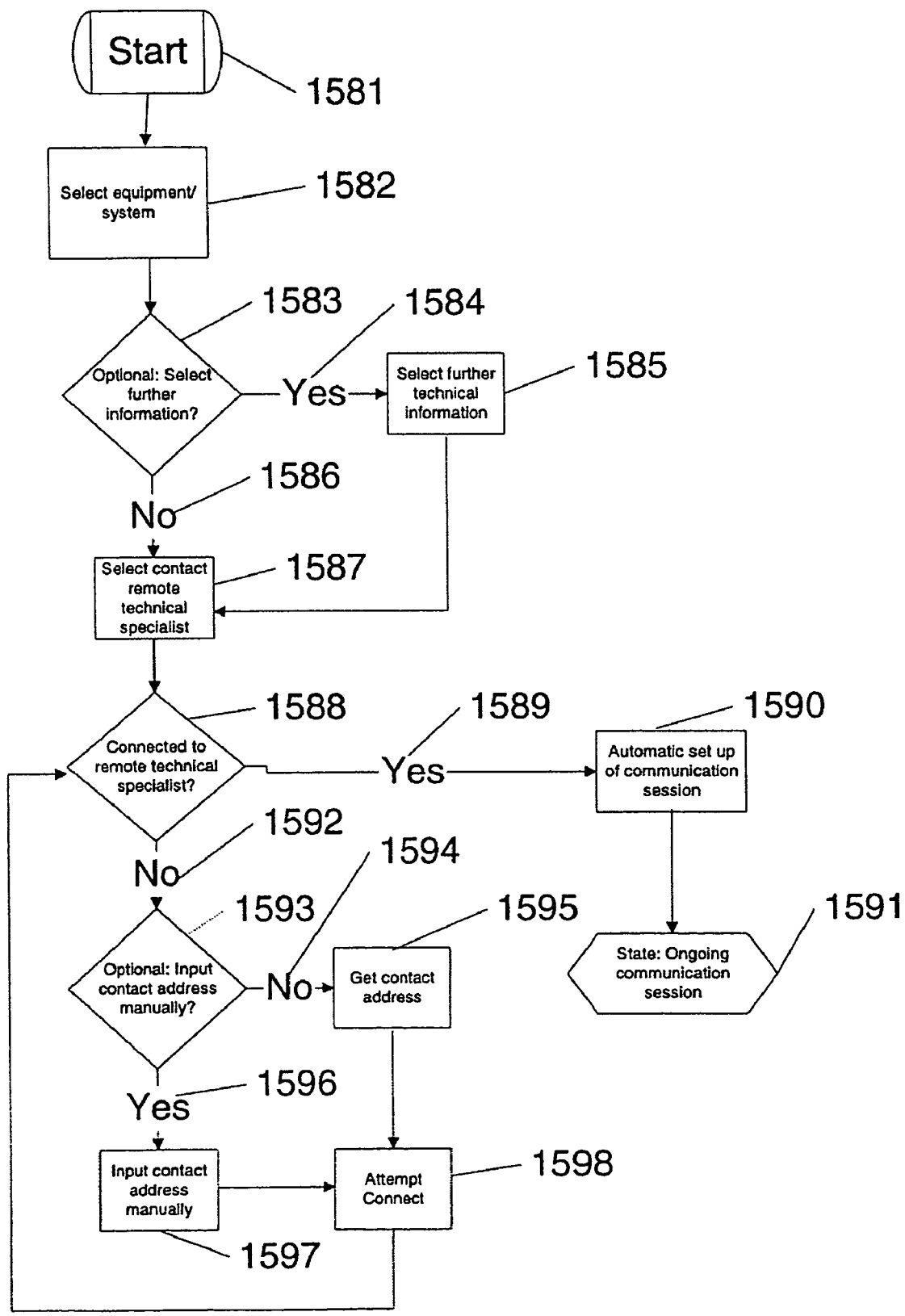
FIG. 15 shows a flowchart for a method to provide communication between a marine vessel and one or more specialists at a remote location according to a preferred embodiment of the invention.

FIG. 15 shows a flowchart for a method according to a preferred embodiment of the invention. Any of the steps and options of this method may be displayed on a computer screen on the marine vessel to carry out steps of the method in a manual or semi-automatic manner. This method begins at Start 1581 with a display on a computer connected to a communications means and which may or may not be connected to a maintenance system, and/or a RMC server. As shown in the flowchart a user then:
selects an equipment and/or a system 1582;
selects an option to obtain further information 1583;
Yes, 1584, select 1585 further technical information from a specialist, select 1587 contact a remote technical specialist;
Connected 1588 to a remote technical specialist;
Result=No, noting that under a first use of the method, there is no existing connection to a remote technical specialist;
Input address manually? 1593 Noting that this may only be shown on screen if no contact address can be automatically derived in 1595. Thus, when a first time a contact address is to be provided, it may be predetermined that nothing is displayed on user screen in step 1593;
1594 Result=No;
1595 get Contact address: This address can be complex. For example, it may contain an IP number, protocol specifications, user name, password, name of virtual meeting room.
1598 attempt connect;
step 1588 Result=Yes 1589;
Automatic setup 1590 of communication session;
Ongoing communication session 1591.

At step 1595 the contact address may be derived in several possible ways:
in the simplest form, there is an ordered list of contact addresses;
the contact address may be derived depending on vessel geographical position;
the contact address may be derived depending on vessel current time zone and/or time of day, and/or day of week;
the contact address may be derived depending on what TYPE of equipment/system was selected in a step such as 1582;
the contact address may be derived depending on what type or selection of equipment/system was selected in a step such as 1582 from, for example, any of 3002*a-b*, 3003*a-h* etc.;
the contact address may be derived depending on a previously agreed service level contract entities such as between a) an entity representing a party with an interest in operations on board marine vessel 1010 with the right to sign contracts on behalf of 1010 and b) an entity representing in some way a set of remotely located technical specialists. The number of remotely located technical specialists may be any number up to thousands of such specialists.

In practice any address list will be handled such that the system attempts to reach the addresses in a predetermined order or priority. Thus, if the first address found that satisfies the priority order does not work, the second is address is tried and so on.

The user logged in to a computer makes a selection from a diagram, table, menu or other representation of the equipment or system in question. This may be done, for example, by pointing with a computer mouse connected to a computer of the computer system and/or left or right-clicking a button on the computer mouse. Alternatively other selection means such as by touching a touch-screen display of the given equipment or entering any kind of command via input means such as a computer keyboard, or a microphone.

The user makes a selection from a diagram, table, menu or other representation displayed and, with a single action, such as by one click of a computer mouse, the user opens a communication session with one or more remote technical specialists and by so doing begins remote monitoring of the marine vessel by means of the immediate messaging/conferencing software. The technical specialist is located most often on land, such as at an equipment suppliers factory as schematically depicted 1012 in FIG. 1. The technical specialist may also be virtually located at a supplier premises by means of data links, communications links and so on to even thought the specialist is at another physical place. In other cases the technical specialist may alternatively be on board another marine vessel, or any other vehicle equipped with suitable communications means, or even in another location of the same vessel.

Figure 9:
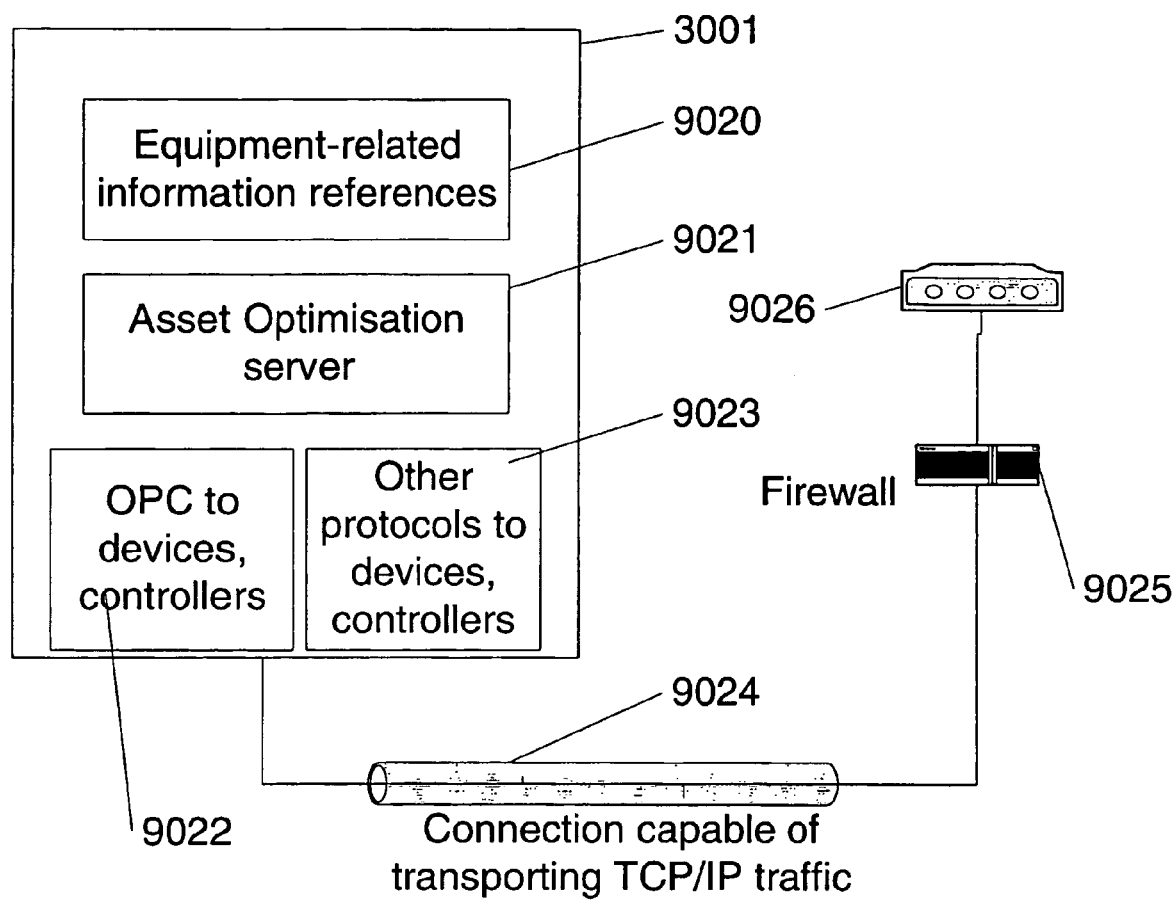
FIG. 9 shows a schematic overview of the RMC server on the marine vessel comprising an Asset Optimisation server, equipment-related information, data servers and other means for communication with devices, equipment and controller, a TCP/IP communication means, a firewall, and a transceiver or other wireless communication means for communication with shore-based systems.

Communication from the marine vessel to land may be carried out using services provided by a satellite communication system, as depicted in FIG. 1, such as Inmarsat or other satellite means, or by means of a substantially land-based radio telephone or mobile telephone communications network with wireless capability in the area where the marine vessel happens to be located at that time, including systems such as GSM, UMTS, or similar as indicated in FIG. 2. FIG. 9 illustrates how an RMC 3001 may be connected via a LAN 9024 using for example Ethernet, via a firewall 9025 and may communicate via a satellite transceiver 9026 and satellites such as 1013, FIG. 1. Once the signals have been communicated to land, by satellite ground station 1011 or a land-based 2011 transceiving station for communication signals going to/from the marine vessel, then onward transmission may be accomplished by, for example, telephone company links to, for example, the Internet, or to private or commercial networks or intranets. By means of such data networks, the signals making up the communication between the marine vessel and a remote specialist are transmitted to the address specified in the transmission from the marine vessel via, for example the Internet, to a remote location 2. At the remote location the one or more technical specialists are either located and logged in or else they have access to a computer there by means of that the specialist is logged in or otherwise virtually present but physically located at another place or, for example, are in a vehicle.

When the communication session is thus established between the marine vessel 1 and technical specialist at a remote location 2 immediate messaging and/or conferencing may take place. The user may thus:

share a computer program application or operating system display, that is, select an action in the communication software to cause a copy of a Graphical User Interface (GUI) of any application running on the user's logged-in computer, RMC server or other control system computer to be displayed on a display of a computer system at the remote location of the technical specialist, communicate with the technical specialist in real time by, for example typing in messages on a computer keyboard; or the user may:

share an and thus see a GUI of an application running on the technical specialist's remote system;

operate a shared computer program running on the technical specialist's computer system.

The technical specialist may:

see or otherwise access a computer display of user-originated technical information or other reports, events, alarms relating to the equipment in question and send technical information to the user via:

instant messaging by means of the communication session described above, such as by typing on a keyboard, inputting information or making changes in a GUI of a computer program application running on the user's computer or on the RMC system 3001, inputting information or making changes that the specialist makes in a computer program application that can access the equipment or system in question, such as one or more of 3002*a-b*, 3003*a-h*, of FIG. 3, via the RMC or an onboard control system.

The technical specialist can then provide technical information to explain a condition of the equipment or system on the marine vessel, propose a diagnostic routine, propose a maintenance routine, a service or repair measure and so on to the user. The technical specialist may also carry out certain of the routine measures or operations normally carried out using the equipment or system in question.

The technical specialist may naturally speak on a telephone at the same time, or participate in a video link. The video link may or may not be included in the communication session software that sets up the instant messaging and or conferencing. The telephone link may or may not be included in the communication session software that sets up the instant messaging and or conferencing. It should be noted that one or more technical specialists may participate in a communication session. The one or more technical specialists may also be physically located in different places and still participate in a virtual meeting and/or share information such as a GUI from the marine vessel.

The technical specialist can also in addition prepare further technical information, projections or cost analyses for different operating modes, and/or maintenance measures or service actions and communicate them to the user on the marine vessel at a later time. In this aspect of the invention the technical expert provides expert knowledge to assist the user to determine the most economic method for operating and/or maintaining equipment on the marine vessel.

The invention may be applied to equipment or systems installed on the marine vessel such as the examples given, eg 3003*a-h*. The invention may also be applied to equipment otherwise associated with the marine vessel but not actually installed on the vessel. Thus an equipment or system of interest may be drilling equipment that the marine vessel is positioned in the vicinity of, such as equipment in a barge or other marine vessel nearby, or even equipment that is underwater or on the seabed and in the vicinity of the vessel. It should also be noted that the user may be any authorised person in the close vicinity of the marine vessel. This may include, for example, a diver inspecting the hull of the ship from outside, a person inspecting oil drill or other oil extraction equipment attached to the vessel.

The communication link from marine vessel 1010 to a remote location 1012, 4012 via a satellite receiver on land may be advantageously and economically carried out by means of commercially available satellite services such as any of Inmarsat, Inmarsat B, VSAT, QSAT, NORSAT. In North America similar geo-stationary satellite systems such as L-band or Leo satellite systems may be used. Communications on or near land may alternatively be carried out by means of for example cellular mobile radio systems such as American Mobile Phone System (AMPS), Nordic Mobile Telephone (NMT) and Total Access Communication System (TACS), digital cellular systems such as Code Division Multiple Access (CDMA) based systems and Time Division Multiple Access (TDMA) based systems (D-AMPS, GSM, PDC, etc.), packet-switched services on cellular systems such as Cellular Digital Packet Data (CDPD), General Packet Radio Service (GPRS) and Enhanced Data rate for GSM Evolution (EDGE), third generation cellular systems such as CDMA2000, Wideband CDMA (wCDMA) and IMT 2000, and so on.

A satellite based telephone system such as Iridium LLC (Trade Mark), Inmarsat (Trade Mark), Inmarsat I-4, ICO Teledesic and ICO Global Communications, and Loral Space & Communication's system Globalstar (Trade Mark) may also be used for communications from and to the marine vessel). Satellite provided phone systems offering 3G type services such as Broadband Global Area Network provided by Inmarsat are yet another communication means.

The conferencing software may be any software that supports immediate messaging or conferencing that enables sharing a display or application on one computer such that it is displayed on a remote computer. Among commercially available products are AOL Instant Messenger available from America Online, Inc., MSN Messenger or Netmeeting available from Microsoft, and Sametime from Lotus/IBM. It may be particularly advantageous to use Sametime in certain situations. One such example may be address books used and maintained by other computer software in the same organisation which may be shared by Sametime. In addition, Sametime also handles many-to-many communications in a way that is suitable for low bandwidth communications channels, enabling a plurality of technical specialists to share, inform and remotely monitor in the same meeting. This differentiates Sametime from certain other softwares, which may not transfer information so fast as Sametime when working over a low bandwidth communications channel with a plurality of technical specialists connected.

Figure 11:
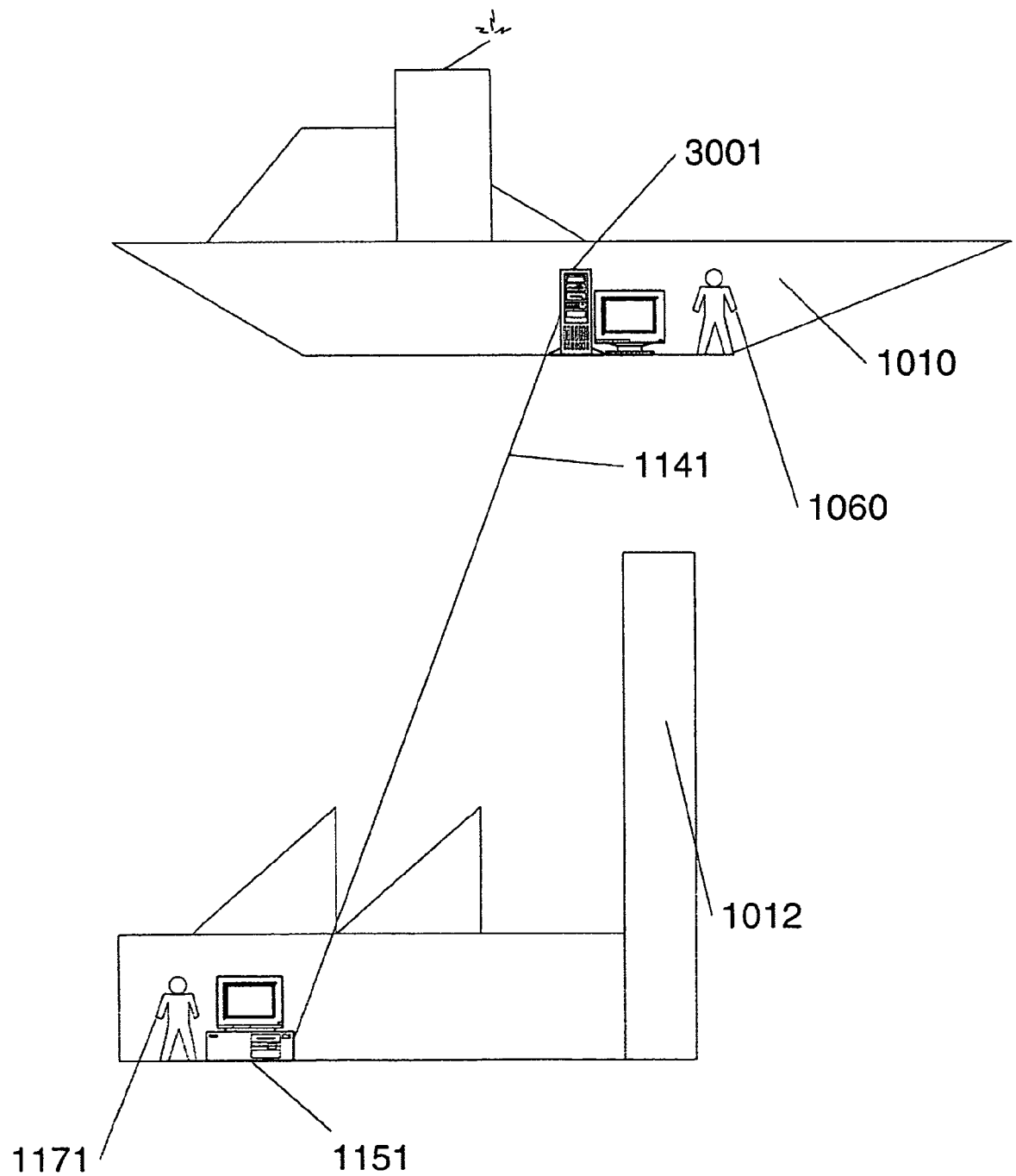
FIG. 11 shows schematically communication between a marine vessel and one or more specialists at a remote location according to a first embodiment of the invention.

FIG. 11 shows a Remote Monitoring and Control Server (RMC) 3001 onboard the marine vessel 1010, and a user 1060 of the RMC system. A communication path 1141 is shown to a remote computer system 1151 at the remote location 1012. In this embodiment the logged in computer is comprised in some way as, or connected to, the Remote Monitoring and Control Server (RMC) 3001. The logical communication path 1141 is established by the instant messaging/conferencing software between the RMC of the marine vessel and a computer system 1151 of a technical specialist 1171 at the remote location 1012 (1012 is also shown in FIGS. 1, 2) is invoked (step 1590 in FIG. 15), unless it is determined to already be existing (step 1588 in FIG. 15). The communication path 1141 is partly enabled by the link shown in FIG. 1 from satellite 1013 to ground station 1011. Path 1141 may alternatively or in part be enabled by the landbased 2011 wireless link of FIG. 2. Remote computer system 1151 has the ability to display whole or parts of the display of the RMC server 3001. Optionally, it can also show or communicate other information, such as audio and video sent from 1010.

Figure 6:
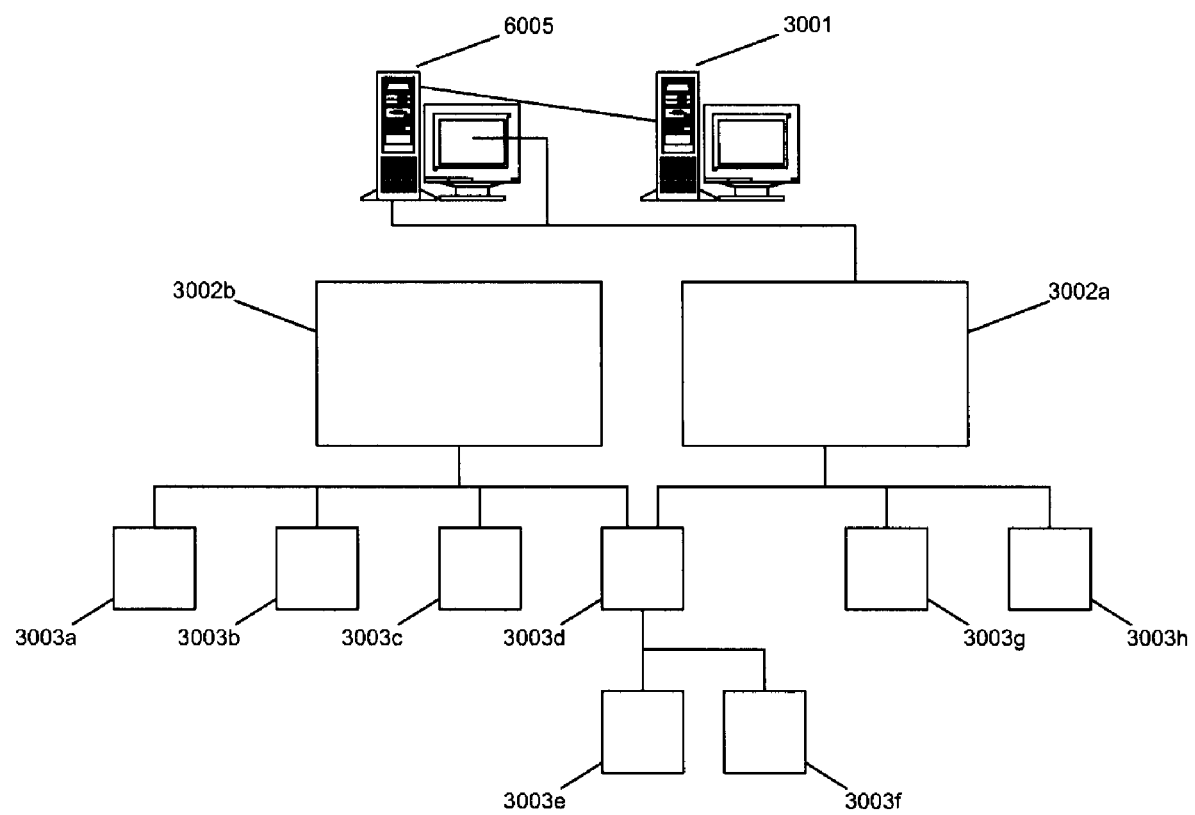
FIG. 6 shows schematically an overview of systems onboard a marine vessel similar to FIG. 3 to which an additional datalogger server is connected according to another embodiment of the invention.
Figure 7:
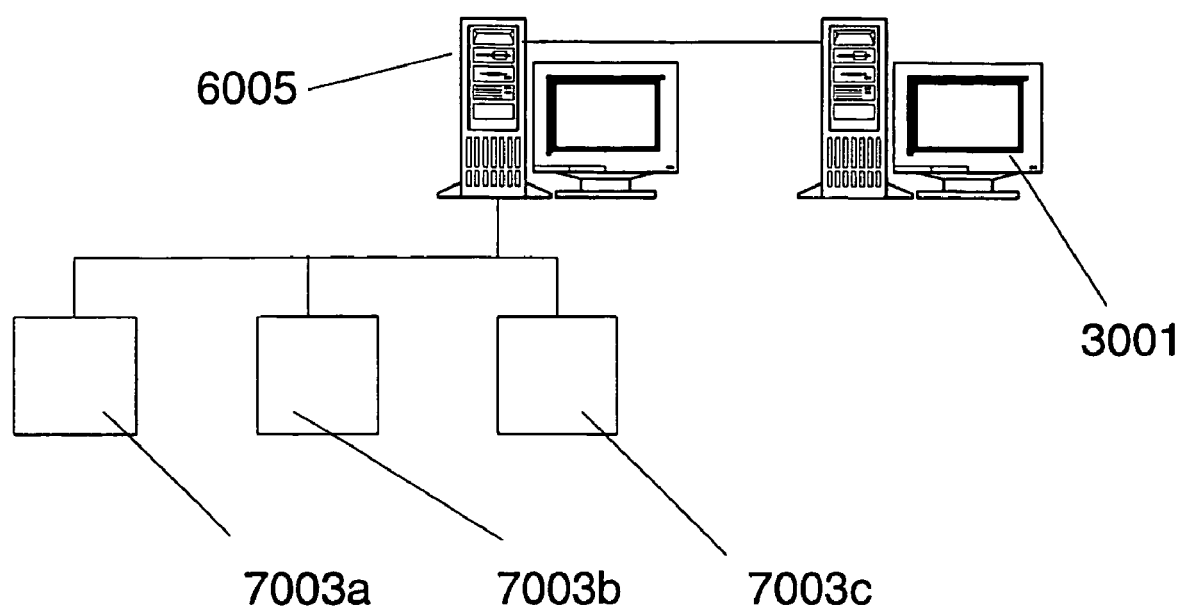
FIGS. 7, 8 show an overview of systems from FIGS. 4, 5 in each of which a datalogger is shown connected.
Figure 8:
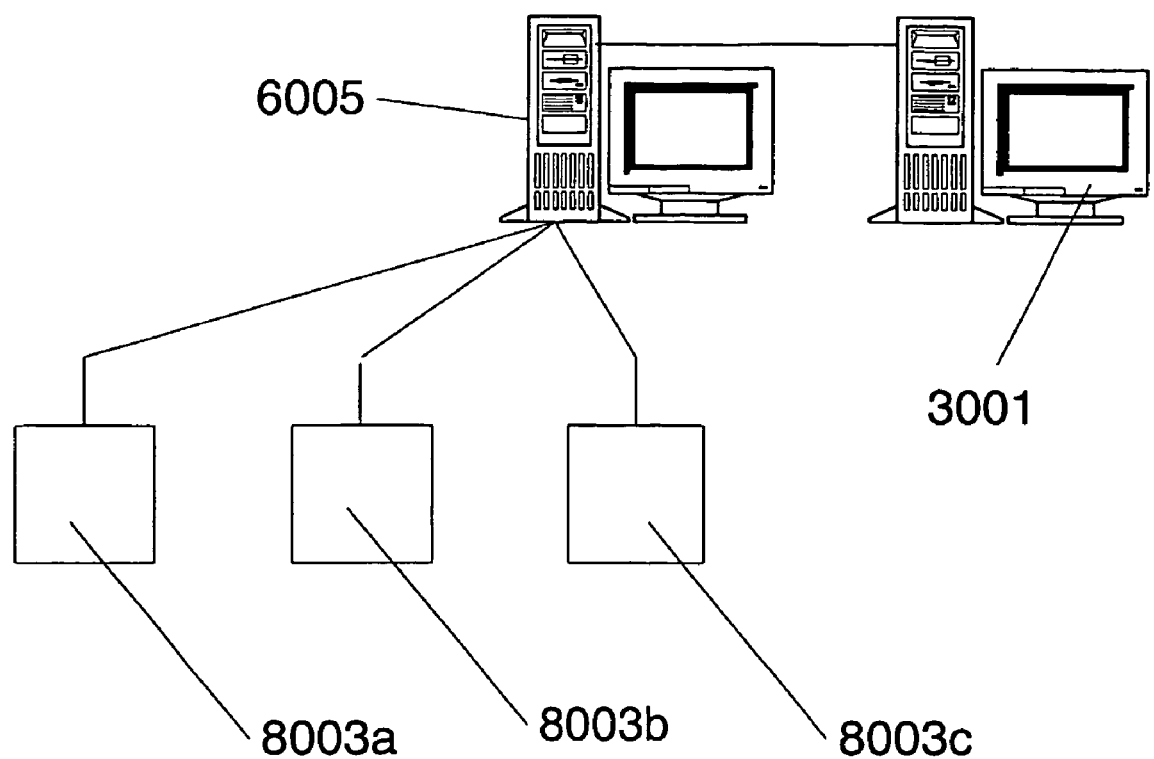

FIG. 6 shows a datalogger server 6005 connected to the RMC server and to devices such as controllers 3002a, 3002b, and a plurality of other equipment and systems 3003a-3003h. Datalogger server 6005 logs information such as events and alarms for equipment and engineering systems onboard the marine vessel. Data may for example be recorded on demand by user, in batches during different time intervals, real time during pre-programmed intervals or collected on another basis. FIG. 9 is a schematic diagram of the RMC server 3001 showing a set of equipment-related information 9020 relevant to one or more equipment or systems, an Asset Optimisation server 9021, and two examples of data interfaces. The first interface is an OPC server or other system interface 9022, and the second another and non-OPC protocol server or other system 9023. OPC refers to the standard known as OLE for Process Control where OLE refers to Object Linking and Embedding. A type of LAN communication 9024, a firewall 9025 and satellite communication transceiver 9026 are shown. The communication function of satellite transceiver 9026 may be carried out by any other wireless transceiver means.

The collected data is made available by the datalogger interface 9022 alternatively 9023 to the RMC 3001. The data may also be made available to additional systems such as a Maintenance System (not shown). Such a Maintenance System may typically be used to present, report, analyze etc. collected data for monitoring, condition based maintenance, scheduling maintenance or repairs etc.

In another preferred embodiment the user logs in to a computer comprised as or connected in some way to the Remote Monitoring and Control Server (RMC) 3001 connected to a communications means such as 9026 on-board the vessel 1010. The user navigates in a program running on the logged in computer or via the RMC to a display showing information and/or one or more graphic or textual representations or schematics of an onboard equipment or system. For example, a display may show a representation of a positioning system, causing controllers such as 3002a and 3002b controlling one or more Azipod units to be displayed. It will be remembered that event and alarm information for equipment on the marine vessel, such as the positioning system equipment, is recorded by the Datalogger 6005.

Referring to FIG. 9. The information from the datalogger 6005 is available to the Asset Optimization server 9021 (as well as any possible Maintenance System). By means of the interfaces 9022, 9023 and the datalogger 6005 the Asset Optimization server may access data such as event and alarm data stored in respect of an equipment or system which in the non-limiting examples shown in FIGS. 3-8 may be positioning system equipment. The Asset Optimization server 9021 can include tools to analyse the stored data and provide reports for maintenance, condition based maintenance and projections based on such data and reports.

Referring to FIG. 15, as described, the user makes a selection 1582 from a diagram, table, menu or other representation displayed by the logged-in computer, the RMC server or a control system to select the equipment or system in question. The onboard control system then presents options to the user related to the equipment or system, which includes an option for obtaining more technical information related to the selected equipment, as described. By means of what is typically a graphical software object representing the equipment or system on the display, the RMC server 3001 then may automatically retrieve the contact address for the technical specialist associated with the selected equipment or system in question. This is enabled within the RMC server by means of that the graphical software object making up the on-screen representation has further information associated with it as a consequence of that the graphical software object represents a given equipment or system.

Figure 12:
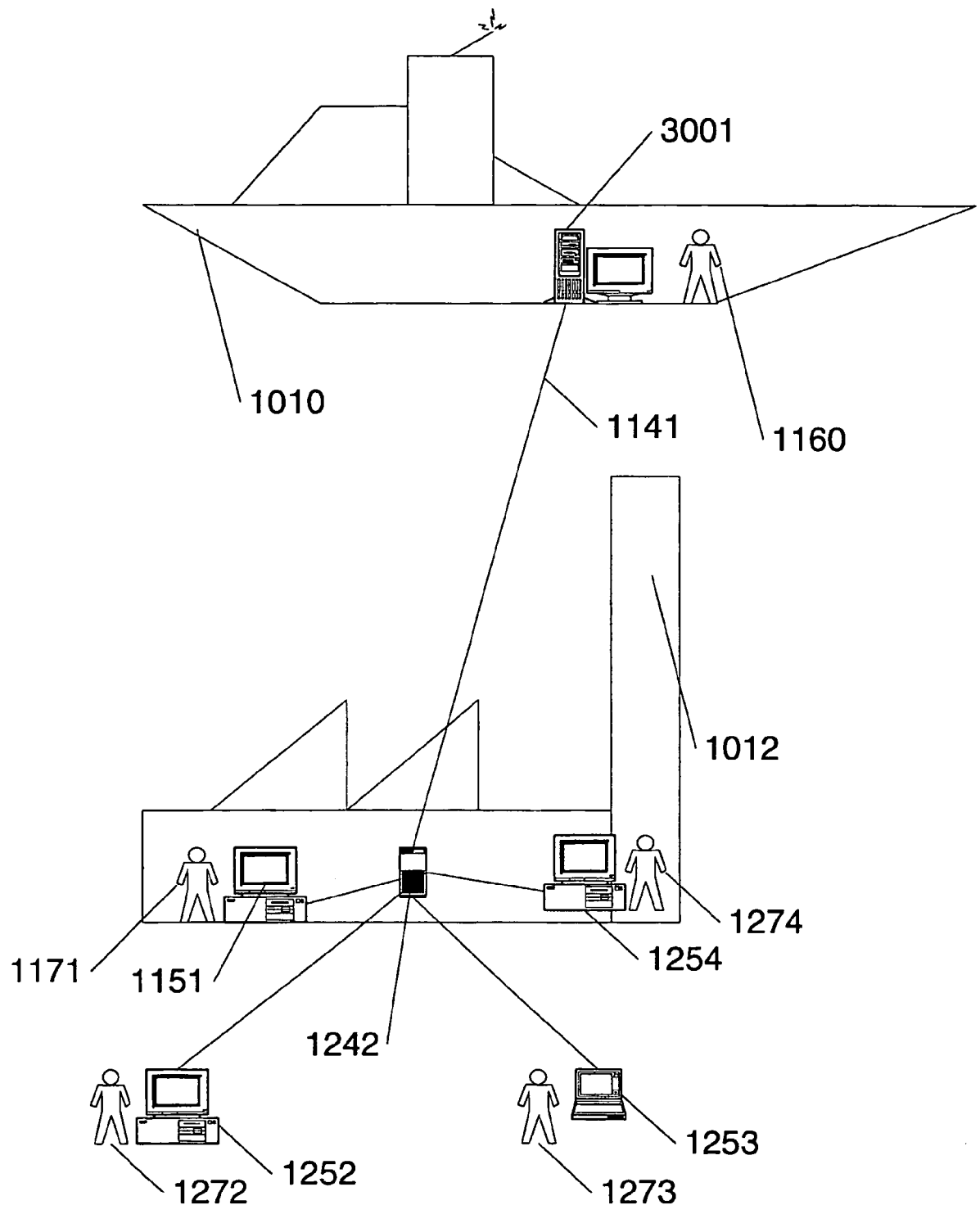
FIG. 12 shows schematically communication between a marine vessel and a plurality of remote locations with technical specialists, where at least one remote location is equipped with a computer system capable of providing a virtual meeting room according to an embodiment of the invention.

FIG. 12 shows an advantageous embodiment in which a server 1242 is positioned relative to the remote location 1012. The server 1242 is a computer system capable of providing a virtual meeting room. The virtual meeting room may include one or more of the following capabilities, but is not restricted to only those: Complete or partial screen sharing, audio, video, shared whiteboard, chat functionality, recording of communication session. The virtual meeting room is preferably implemented as a Sametime server, and may alternatively be a server supporting other instant messaging/conferencing software means including any of the examples cited above.

Figure 13:
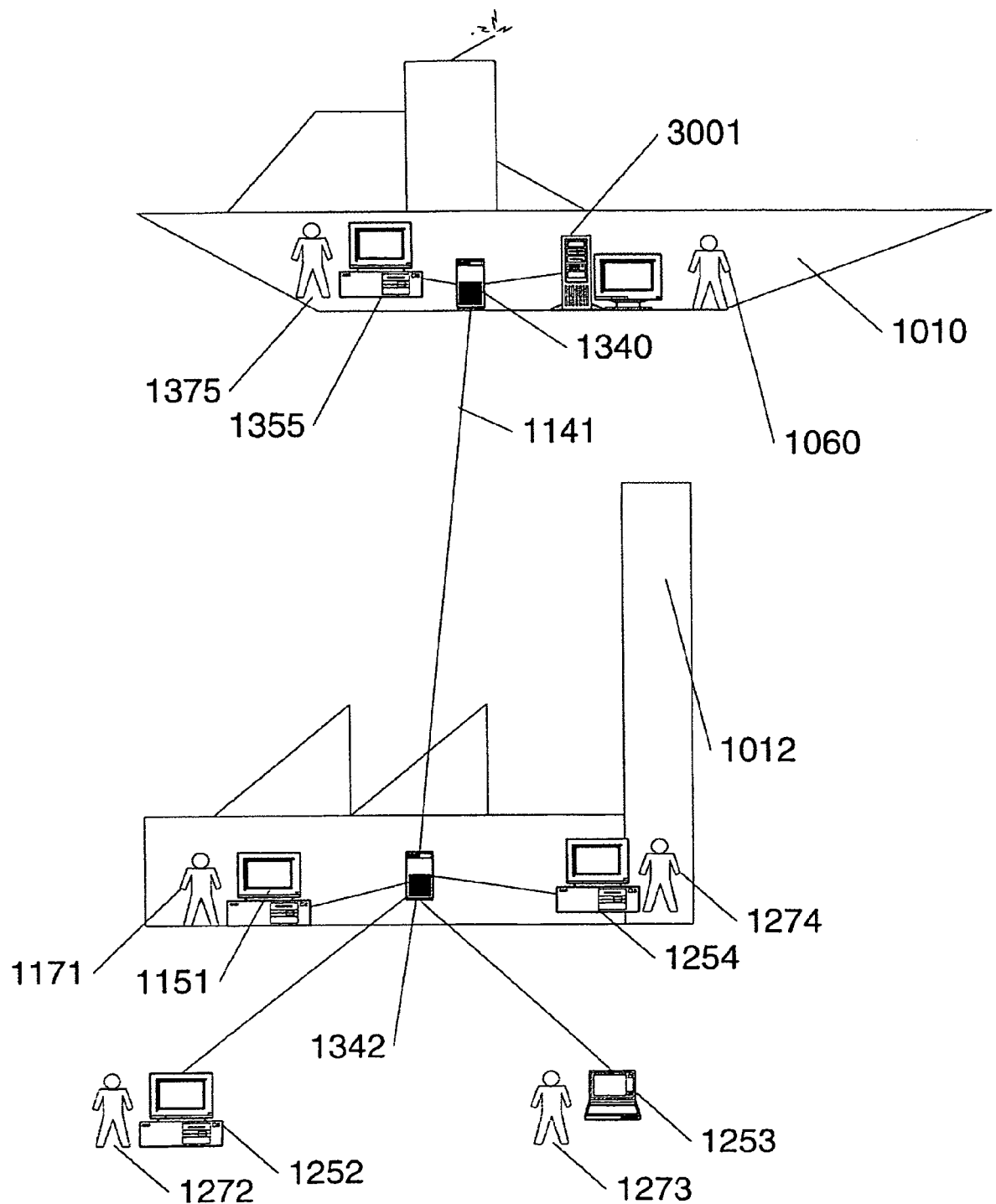
FIG. 13 shows schematically communication between a marine vessel and a plurality of remote location with one or more specialists, where the marine vessel and a remote location are both equipped with a computer system capable of providing a virtual meeting room according to an embodiment of the invention.

FIG. 13 shows another embodiment of the invention wherein a second virtual meeting room server 1340 is located on the marine vessel 1010. It has the advantage of minimizing the amount of traffic on communications path 1141 when there are one or more instances of a remote terminal such as 1355 onboard the marine vessel 1010.

Figure 14:
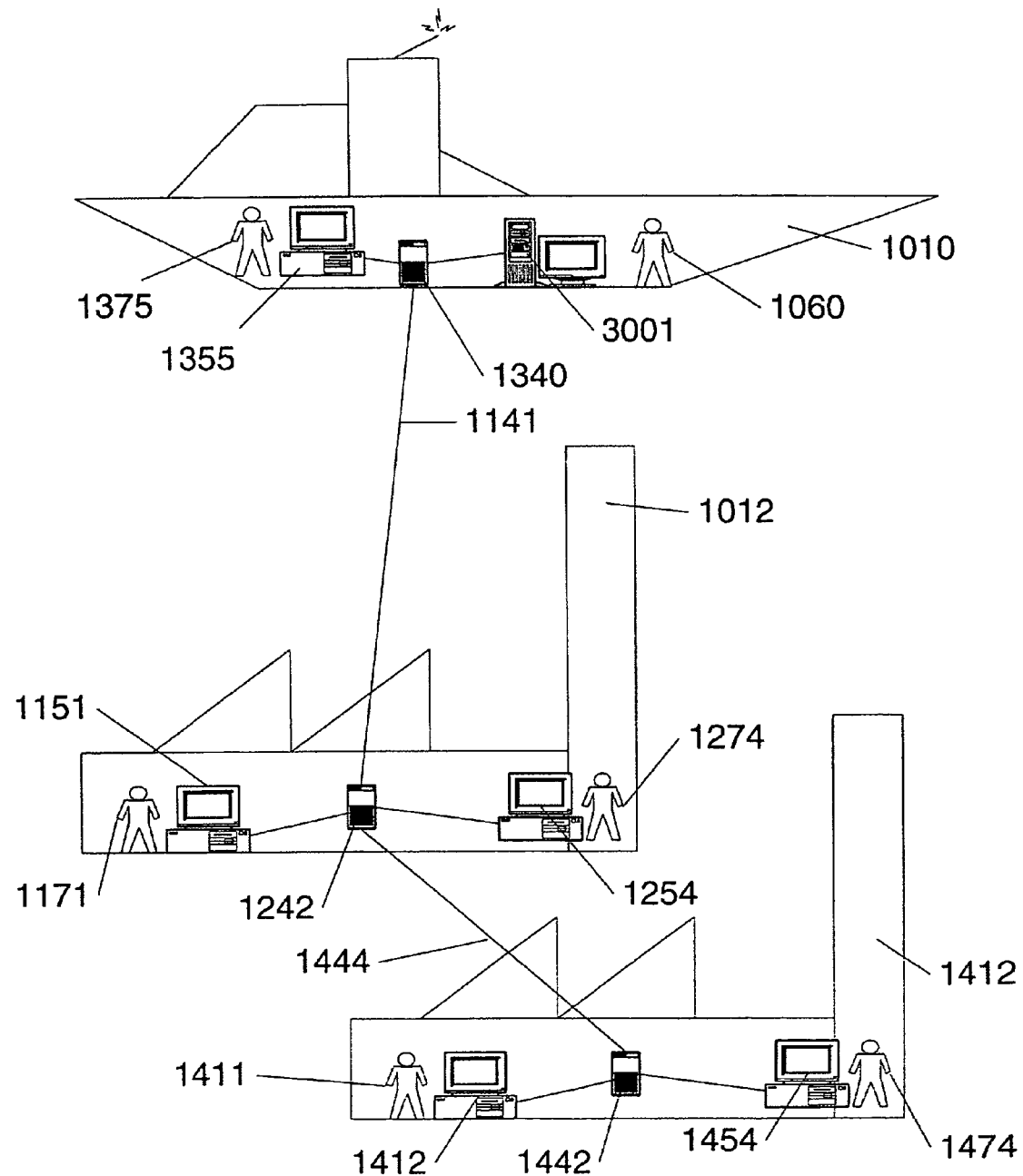
FIG. 14 shows schematically communication according to the embodiment of FIGS. 13 and 12 in which the communications between systems at remote locations is arranged or shared using a second computer system capable of providing a virtual meeting room according to a development of the invention.

FIG. 14 illustrates another aspect of the invention. In the embodiment shown, a third virtual meeting room server 1242 is shown associated with a second remote location 1412. Communication sessions involving both locations 1012, 1412 are facilitated using a communication path 1444. The purpose is to balance a load between 1242 and 1442 when there are many users, and/or possibly where the communication means are expensive between 1412 and 1242, and/or between 1454 and 1151.

In a further advantageous and best use of the invention, a control system including at least an Aspect Integrator Platform supplied by ABB is used to carry out the role of Asset Optimization server 9021, FIG. 9. In such a control system or platform, each software object in the computer program is a most likely a composite object as defined in WO00102953, and information about each data item that is associated with a certain composite object is provided by an aspect of that composite object. For example a contact address or a set of contact addresses, optionally combined with password/usernames, for a technical specialist for a particular equipment or system may be provided by means of a reference held by an aspect of a software object representing the equipment or system on a display of such a control system.

Figure 10:
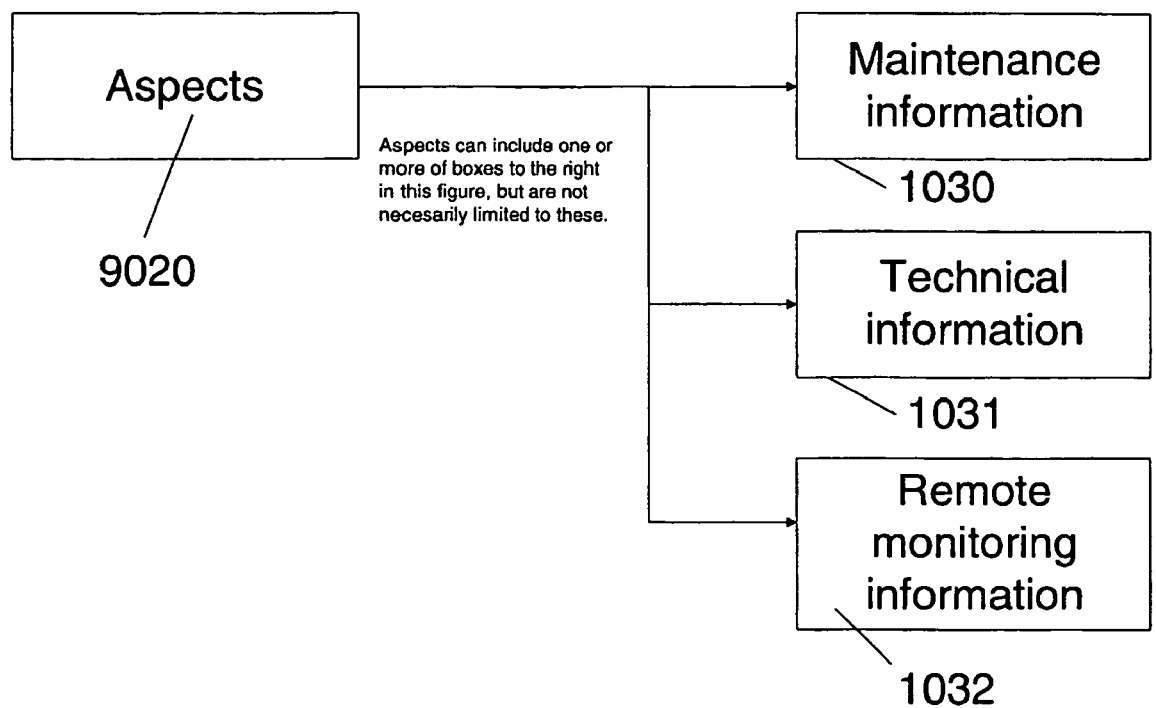
FIG. 10 shows schematically equipment-related information types that may be comprised in the equipment-related information references shown in FIG. 9.

FIG. 10 shows schematically some of the possible information types that may be comprised as Aspects of the equipment or system, as indicated in FIG. 9.

The Asset Optimization functionality is best implemented as one or more Aspect Systems on the Aspect Integrator Platform (AIP) provided by ABB. The datalogging function of datalogger 6005 (FIG. 6) may be combined with the Asset Optimization function 9021 (FIG. 9) to provide one or several computer systems that may have the ability to:

a) collect (or receive) ship information,
b) store,
c) analyse the data,
d) present data to on-board personnel,
e) be used to invoke remote monitoring,
f) used to carry out possible control actions by a remote user.

In carrying out the method of the invention different forms of communication, including wireless communication may be used. One or more of the communications may consist in part of a data communication signal. The data communication signal in part of a data transmission between the marine vessel and another location may be embodied in any data format, dependent in part on whether the data communication signal is encrypted and in what way.

The communications from and to the marine vessel may advantageously be encrypted to maintain privacy and to minimize the possibility of unauthorised access to data communication systems of the marine vessel. The data signals making up the communications may be encrypted in some way. Examples of such encryption, without being limited to such examples, are encryption of:

a first protocol that is used to convey the signal,
TCP packets,
IP packets,
a carrier protocol that is used to carry higher level protocols such as TCP and IP. Another example is a physical means for making a signal harder to trace and recover, for example, using a jump frequency or frequency-hopping approach for TCP or IP or any protocol carrying TCP or IP.

Approaches to such encryption may include, without being limited to, examples such as:

IPsec (IP Security),
Jump frequency/frequency hopping systems for links from vessel to another point such as land-based station or satellite,
encryption present in Sametime or a product provided with it,
encryption built in to other instant messaging/conferencing software such as Citrix MetaFrame (TM) Tarantella (TM) Symantec pcAnywhere (TM), VPN (Virtual Private Network) based solutions,
encryption built into satellite communication protocols,
encryption available under telephone standards such as, AMPS, NMT, TACS, CDMA or TDMA based systems, D AMPS, GSM, PDC, CDPD, GPRS, EDGE, CDMA2000, wCDMA, IMT2000 and satellite phone services Iridium LLC (Trade Mark), Inmarsat (Trade Mark), Inmarsat I-4, ICO Teledesic and ICO Global Communications, Globalstar,
SSL (Secure Socket Layers).

A computer program product comprising the computer program code and/or software elements for carrying out steps of a method according to the invention may be stored, at least in part, on different mediums that are computer readable. Archive copies may be stored on standard magnetic disks, hard drives, data storage devices in data servers, web servers or as CD or DVD disks, or on magnetic tape. The different parts of this computer program product may, for example at different times, be stored in any of; a volatile Random Access memory (RAM) of a computer or processor, a hard drive, an optical or magneto-optical drive, or in a type of non-volatile memory such as a ROM, PROM, or EPROM device. The computer program product may also be arranged in part as an embedded system in a device. The computer program product may also be arranged in part as a distributed application capable of running on several different computers or computer systems at more or less the same time.

It is also noted that while the above describes exemplifying embodiments of the invention, there are several variations and modifications which may be made to the disclosed solution without departing from the scope of the present invention as defined in the appended claims. As an example, instead of OPC, some other well-known interface for access to real-time data, historical data, and alarm and event data, or any subset thereof, may be used.

The invention claimed is:

1. A method for providing technical information from a marine vessel to a remote location, the technical information relating to an equipment or system associated with, or installed on, the marine vessel, with a computer connected and logged-in to a communication system of the marine vessel, wherein the equipment or system is selected from a group comprising motors, generators, propulsion units, valves, pumps or field devices installed on the marine vessel, and wherein the information is selected from a group comprising diagnostic, maintenance, or operational information, the method comprising:

receiving an identification of a selected equipment or system,
determining a geographical position of the selected equipment or system;
initiating a communication session on the logged-in computer,
selecting an address of a remote computer from an address list of one or more technical specialists associated with the selected equipment or system, wherein the address is selected based on the geographical position, sending a message to the selected address, initiating a communication session between the logged-in computer and the remote computer, displaying technical information at the logged-in computer sending the technical information to the remote computer and causing the remote computer to display the technical information, receiving a selection of part of the technical information, transmitting the selected part of the technical information to the remote computer, and receiving diagnostic, maintenance, or operational information regarding the selected equipment or system from the remote computer, wherein the received information is based at least in part on the selected part of the technical information sent to the remote computer.

2. The method according to claim 1, further comprising: enabling between the logged-in computer and the remote computer instant messaging and/or conferencing in the communication session.

3. The method according to claim 1, further comprising: making available a graphical user interface (GUI) of an application executing at the logged-in computer, wherein the GUI is shared with the remote computer.

4. The method according to claim 1, further comprising: making available a graphical user interface (GUI) of an application executing at the remote computer, wherein the GUI is shared with the logged-in computer.

5. The method according to claim 4, further comprising: making available a GUI of an application executing on the logged-in computer for the remote computer to take over control and thereby enabling the logged-in computer to be interrogated and/or controlled from the remote computer.

6. The method according to claim 1, further comprising: enabling instant messaging and/or conferencing in the communication session between the logged-in computer and multiple remote computers.

7. The method according to claim 1, further comprising: enabling instant messaging and/or conferencing of technical information about a multiple equipment and/or equipment systems associated with the marine vessel.

8. The method according to claim 1, wherein the logged-in computer comprises a Remote Monitoring and Control Server.

9. The method according to claim 1, wherein the logged-in computer is connected to an Asset Optimisation server.

10. The method according to claim 1, wherein the technical information comprises maintenance information.

11. The method according to claim 1, wherein the technical information comprises diagnostic information stored locally and based on any of: reports, conditions, events, or alarms.

12. The method according to claim 1, wherein the equipment or system associated with the marine vessel comprises equipment installed onboard the marine vessel.

13. The method according to claim 1, wherein the equipment or system associated with the marine vessel comprises equipment installed in the vicinity of the marine vessel.

14. The method according to claim 1, wherein the equipment or system associated with the marine vessel comprises equipment installed underwater or on the seabed in the vicinity of the marine vessel.

15. The method according to claim 1, further comprising: transmitting the technical information to and from the marine vessel at least in part by wireless communication means.

16. The method according to claim 15, wherein the wireless communication means comprises satellite communication using a system including any of: Inmarsat, VSAT, QSAT, NORSAT, L-band, Leo, Iridium.

17. The method according to claim 15, wherein the wireless communication means comprises a radio telephone system such as any of AMPS, NMT, TACS, CDMA or TDMA based systems, D AMPS, GSM, PDC, CDPD, GPRS, EDGE, CDMA2000, WODMA, IMT2000.

18. The method according to claim 15, wherein the technical information is transmitted in part formatted suitable for an Internet standard which may be any of: HTML, a HTML derivative, I-MODE, WAP, WDML.

19. The method according to claim 1, wherein the communication is transmitted in an encrypted form, including and not limited to IPsec.

20. The method according to claim 19, wherein the communication is transmitted in an encrypted form dependent on transmission in part by frequency hopping.

21. The method according to claim 19, wherein the communication is transmitted in an encrypted form dependent on a protocol according to a telephone standard including any of: AMPS, NMT, TACS, ODMA or TDMA based systems, D AMPS, OSM, PDC, CDPD, GPRS, EDGE, CDMA2000, WCDMA, IMT2000.

22. The method according to claim 1, wherein the remote location comprises any of: on land, in another marine vessel, in another part of the same vessel.

23. The method according to claim 1, wherein the user comprises any authorized one of: operator, technician, maintenance person or other authorized person on the marine vessel, a diver in the water.

24. The method according to claim 23, further comprising: selecting with the graphical representation displayed on the logged-in computer an option to obtain technical information about the equipment or system.

25. The method according to claim 23, wherein the graphical representation associated with the equipment or system is associated by a computer program product of the onboard control system with information about technical support for the equipment, wherein the computer program product comprises a computer readable medium.

26. The method according to claim 23, wherein the address comprises an address selected from a list of addresses in a predetermined manner.

27. The method according to claim 23, wherein the graphical representation associated with the equipment or system comprises a software entity comprising a container for one or more aspects.

28. The method according to claim 23, wherein the software entity is embodied as an aspect.

29. The method according to claim 1, wherein the option to communicate is activated by selecting a graphical representation associated with the equipment or system of the marine vessel displayed by the logged-in computer.

30. The method according to claim 1, wherein the option to communicate is activated by selecting a text based option associated with the equipment or system of the marine vessel displayed by the logged-in computer.

31. The method according to claim 1, wherein the address for the technical specialist is provided by an aspect of the selected equipment in the onboard control system.

32. The method according to claim 1, wherein the technical information comprises economic evaluations of maintenance options based any of the technical information.

33. The method of claim 1 further comprising receiving a command from the remote computer and controlling the selected equipment or system in accordance with the received command.

34. The method of claim 1 further comprising selecting the address of the remote computer based on a current time at the geographical location.

35. A tangible computer-readable medium having instructions stored thereon, the instructions, comprising:
   receiving an identification of a selected equipment or system,
   determining a geographical position of the selected equipment or system;
   receiving an identification of a selected equipment or system,
   initiating a communication session on the logged-in computer,
   selecting an address of a remote computer from an address list of one or more technical specialists associated with the selected equipment or system, wherein the address is selected based on the geographical position,
   sending a message to the selected address,
   initiating a communication session between the logged-in computer and the remote computer,
   displaying technical information at the logged-in computer,
   sending the technical information to the remote computer and causing the remote computer to display the technical information,
   receiving a selection of part of the technical information,
   transmitting the selected part of the technical information to the remote computer, and
   receiving diagnostic, maintenance, or operational information regarding the selected equipment or system from the remote computer, wherein the received information is based at least in part on the selected part of the technical information sent to the remote computer.

36. A system, comprising:
   a component configured to receive an identification of a selected equipment or system;
   a component configured to determine a geographical position of the selected equipment or system;
   a component configured to initiate a communication session between a logged-in computer and a remote computer,
   a component configured to select an address of the remote computer from an address list of one or more technical specialists associated with the selected equipment or system, wherein the address is selected based on the geographical position,
   a component configured to send a message to the selected remote address,
   a component configured to display the technical information at the logged-in computer,
   a component configured to send the technical information to the remote computer and to cause the remote computer to display the technical information at the remote computer,
   a component configured to receive a selection of part of the technical information,
   a component configured to transmit the selected part of the technical information to the remote computer,
   a component configured to receive diagnostic, maintenance, or operational information regarding the selected equipment or system from the remote computer based at least on the selected part of the technical information sent to the remote computer, and
   a component configured to receive a command from the remote computer and to control the selected equipment or system in accordance with the received command.

* * * * *

UNITED STATES PATENT AND TRADEMARK OFFICE
CERTIFICATE OF CORRECTION

PATENT NO. : 7,664,815 B2 Page 1 of 1
APPLICATION NO. : 10/923093
DATED : February 16, 2010
INVENTOR(S) : Gundersen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Seventh Day of December, 2010

David J. Kappos
*Director of the United States Patent and Trademark Office*